March 19, 1935.  J. V. L. HOGAN  1,994,708
TELEVISION SCANNING SYSTEM
Filed Aug. 14, 1931  2 Sheets-Sheet 1
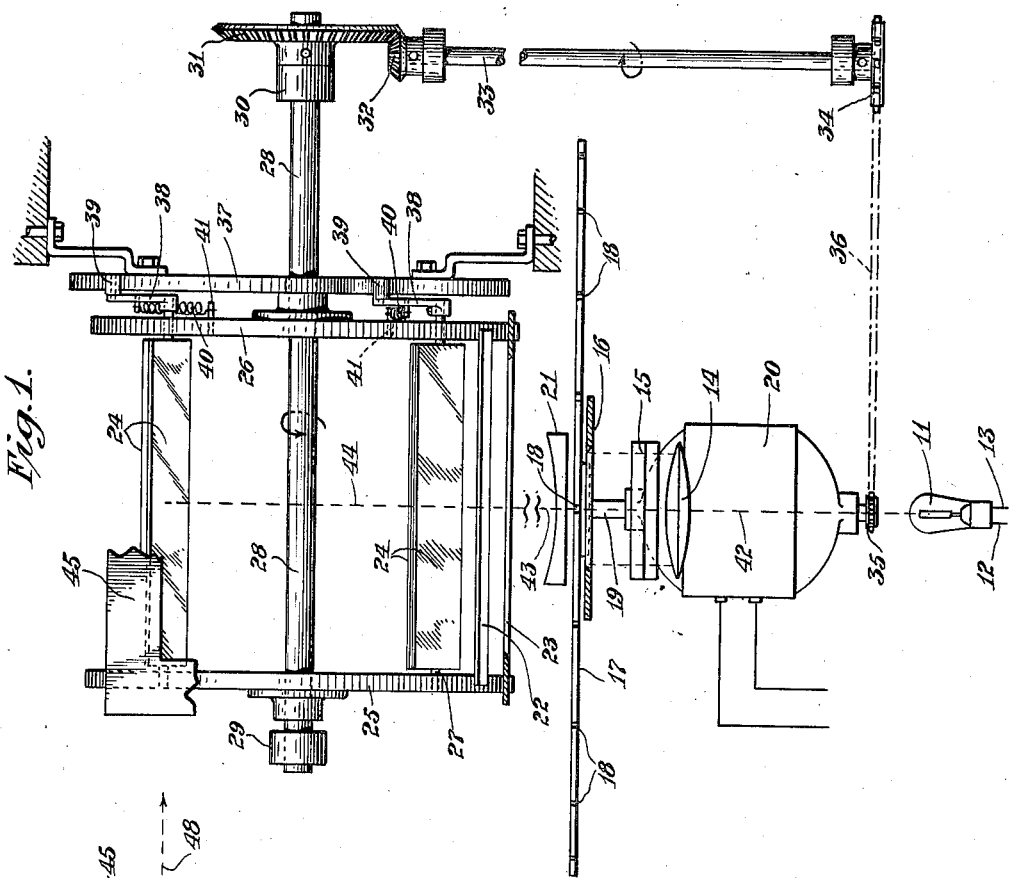
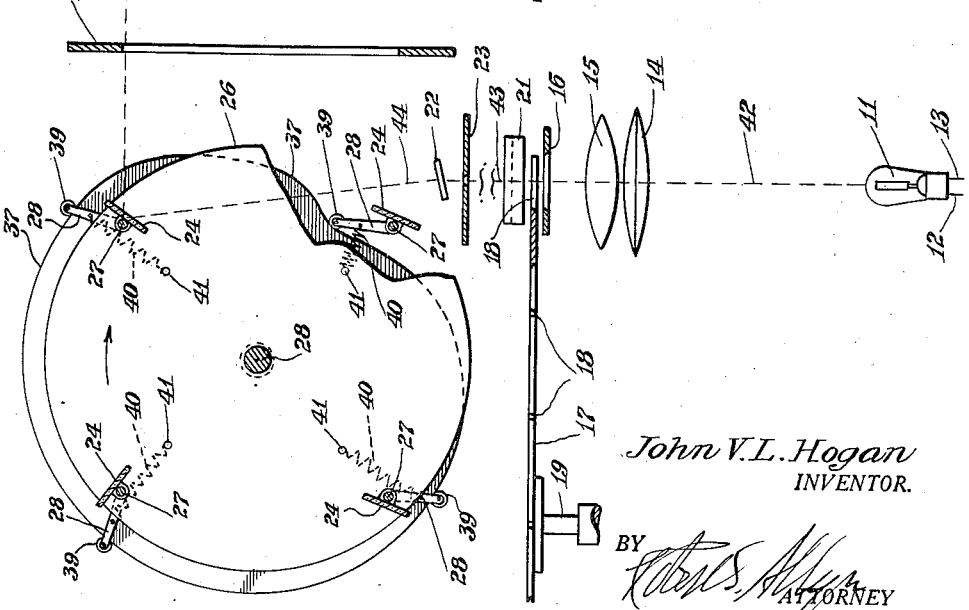
John V. L. Hogan
INVENTOR.

March 19, 1935.　　　J. V. L. HOGAN　　　1,994,708
TELEVISION SCANNING SYSTEM
Filed Aug. 14, 1931　　2 Sheets-Sheet 2
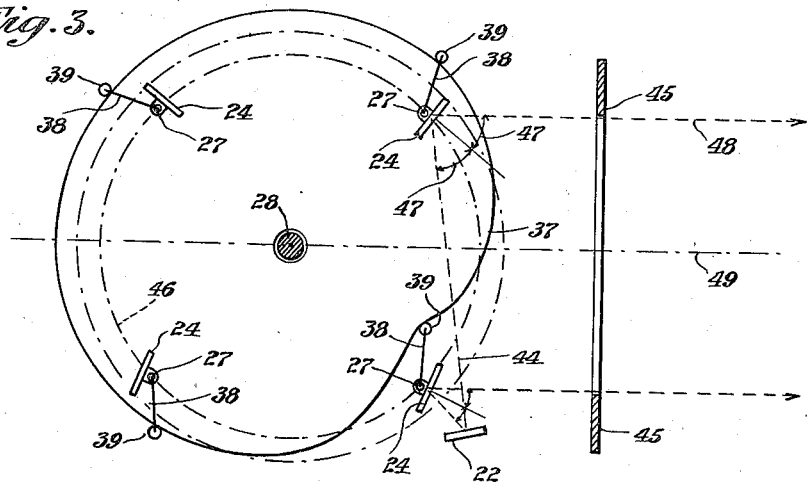
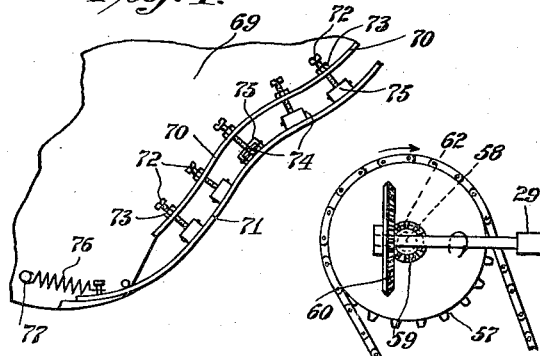
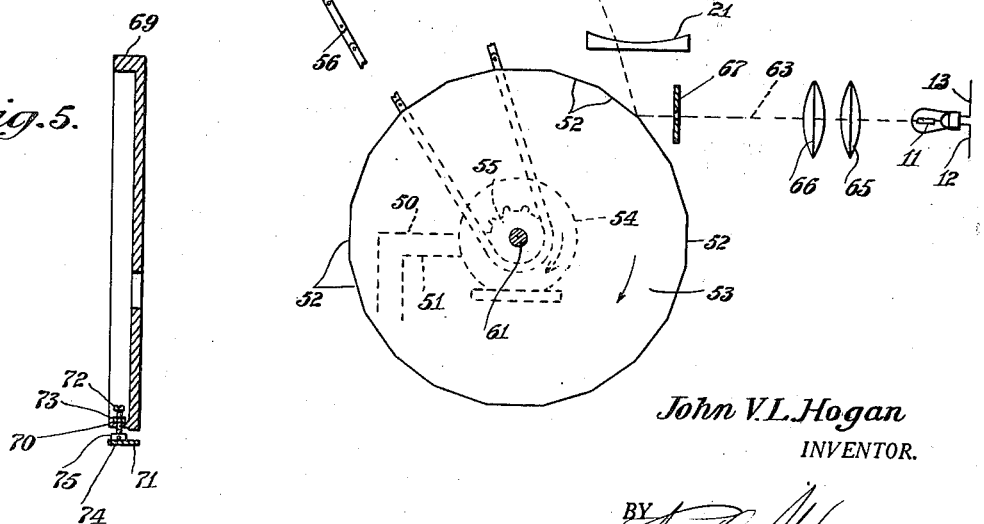
John V. L. Hogan
INVENTOR.
BY
ATTORNEY Patented Mar. 19, 1935

1,994,708

UNITED STATES PATENT OFFICE 1,994,708

TELEVISION SCANNING SYSTEM

John V. L. Hogan, Forest Hills, N. Y., assignor to Radio Inventions, Inc., New York, N. Y., a corporation of New York Application August 14, 1931, Serial No. 557,006

8 Claims. (Cl. 178—6)

The present invention is an improved method and means for scanning an optical image, as in television reception.

One limitation common to certain previously used methods of scanning images is that the images obtained are comparatively small relative to the size of apparatus needed to obtain them.

Another limitation inherent in certain other commonly employed methods of scanning is that the observer must be positioned within narrow limits in order clearly to see the image.

Another fault common in the case of some other methods of scanning is that the images are dim or lacking in brilliance.

A further difficulty common in certain other methods of scanning is that the image is distorted, especially if its apparent size is enlarged by means of lenses or other optical system.

One object of my invention is to secure a larger image than usual from a given size of apparatus.

Another object of my invention is to provide an advantageous ratio of horizontal visual perceptive angle to vertical visual angle, defined and/or distributed over a wide area at various distances and elevations from the scanning apparatus.

A further object of my invention is to provide a brilliant image by means of an apparatus incorporating high optical efficiency.

An additional object of my invention is to secure a reproduced optical image free from distortion.

A still further object of my invention is to provide an apparatus for accurate scanning, requiring for its manufacture a relatively low degree of precision of machined parts.

My invention provides a reproduced image, large relative to the size of apparatus used, visible by an observer over wide limits of position, with minimum distortion and of good brilliancy.

More particularly this invention comprises apparatus for scanning optical images in at least one dimension by means of moving light deflecting or reflective surfaces which may be substantially planar in a direction perpendicular to the direction of scanning and which move substantially in the scanning direction, but whose effective angle of reflection changes as each passes across the image to be scanned. Such reflectors may individually describe a substantially circular path around a secondary axis which is perpendicular to the line of scanning, as will appear from the following specification.

There are many possible forms of apparatus embodying my invention with reference to the method of line-scanning, of which a limited number are here disclosed.

Figure 1 shows a front elevation of apparatus comprising one form of my invention.

Figure 2 shows, partly in section, an elevation of the apparatus of Figure 1.

Figure 3 is a diagrammatic side elevation indicating part of the optical system of my invention in order to explain the field scanning action.

Figure 4 is a sectional side view of an adjustable plate cam to secure field scanning.

Figure 5 shows a sectional elevation of the cam of Figure 4.

Figure 6 is a front view of line-scanning apparatus utilized in another form of my invention.

Referring now to Figure 1, 11 is a light source such as a spot-source tube capable of being modulated in brilliancy by the signal from a television transmitter, supplied to it through leads 12 and 13. A spherical convex lens 14 and a cylindrical convex lens 15 serve to concentrate and direct the light from 11. A light stop 16 of rectangular or other suitable shape further limits the light beam.

17 represents a disc of thin material provided with radial scanning slits 18 mounted upon the shaft 19 of motor 20, which latter is preferably of the constant speed or synchronous type, with suitable power supply leads, and operated in synchronism with the received signals.

Each slot 18 is preferably machined with sharp beveled edges to decrease the optical depth of the slot aperture. 21 is a lens of a cylindrical concave type and may be used to spread longitudinally the light emergent from it, thereby allowing the use of a smaller disc for 17 than would otherwise be possible.

A diffusing screen 22 for instance of ground glass is mounted in the field of lens 21. Interposed between lens 21 and screen 22 is a stop 23 provided with a narrow slit-shaped aperture also preferably having beveled edges.

A plurality of plane or slightly convex cylindrical mirrors 24 are mounted between end-plates 25 and 26 upon pivots 27, and may be ordinary glass mirrors or constructed of metal or plated with polished silver, chromium, Monel metal or the like. The end plates 25 and 26 are mounted on shaft 28 which is supported in bearings 29 and 30 and rotated by motor 20 for instance through bevel gears 31 and 32, shaft 33, sprockets 34 and 35, and chain 36, and derive rotational driving impulse from motor 20 so as to bear a rotative speed synchronously related to that of the scanning disc, or by other suitable drive system.

A stationary plate cam 37 is mounted adjacent end plate 26 and is provided with a central opening for the passage of shaft 28. Mirror shafts or pivots 27 are provided at their extremities with rocker arms 38, which carry follower rolls 39 bearing upon plate cam 37. Helical springs 40 fixed to end plate 26 by studs 41 maintain tension upon rocker arms 38 so as to obtain a proper following action relative to the cam 37.

Referring now to Figure 2, a light beam 42 is shown projected through focusing lenses 14 and 15 and stop 16 upon revolving line-scanning disc 17. Light beam 42 after passing through slot 18 in disc 17 continues through lens 21. Light beam 43 emergent from lens 21 impinges upon diffusing screen 22 as a bright spot. The spot progresses longitudinally along screen 22 at a practically constant velocity determined by the speed of disc 17. After diffusion, the secondary light beam indicated at 44 impinges upon a field-scanning mirror 24 and is reflected to the eye of the observer. A rectangular or other suitably shaped framing stop 45 may be used to limit the visible image to a single complete picture.

Referring to Fig. 3, depicting in greater detail the mechanical and optical action of the field-scanning mirror 24, let N represent the number of mirrors shown, then they are spaced 360/N degrees apart on their axle-circle 46, which is the circle passed over by their axes when the entire structure rotates. The useful arc on axle-circle 46 through which each mirror in turn acts is therefore 360/N degrees. As mirror 24 traverses the useful field, its effective angle with incident ray 44 is indicated at 47 and preferably may be always such as to reflect ray 48 substantially parallel to center line 49 of the field.

As an alternative, angle 47 may be always such as to reflect ray 48 to a selected "median position" on center line 49 of the field, from which position an observer will see the image with no vertical distortion. In either case the laying out of cam 37 is a simple construction since the position of screen 22 may be located almost as far back as the perpendicular from centerline 49 through the terminal position of mirror 24 in the useful field. An advantage of a position well back is that mirror 24 will be required to rotate less on its axle, so that rocker arms 38 swing through a smaller angle than otherwise.

Referring to Figs. 4 and 5, an alternative form of plate cam is shown, in which the cam surface is adjustable in that portion which is active over the useful range of mirror 24. This cam may be derived from that of Fig. 3 by cutting away part of the cam surface and substituting therefor a flexible ribbon 71, whose position is adjustable by means of set screws 72.

Set screws 72 are set in threaded holes through a flange 70 on the plate cam, and locked after adjustment by lock nuts 73. Sockets 75 are fastened to the ribbon by brazing or a similar method, and each is pierced by a small hole allowing the insertion of a short pin 74. Set screw 72 bears at its extremity a small hole so that when inserted into socket 75, the pin 74 may be inserted through the hole in socket 75 and engage the hole in set screw 72, allowing said set screw to turn in socket 75. Take-up of ribbon 71 during adjustment is provided by a spring 76 at one end, fixed to the plate cam by stud 77, and exerting tension longitudinally on ribbon 71.

While not confining myself to any especial size or speed of parts, the following figures are illustrative of the relation of such quantity to one another.

The product of the number of field-scanning mirrors 24 times the speed of shaft 28 in R. P. S. is equal to the number of pictures per second. For example, the number of field-scanning mirrors 24 may be 4, and the speed of shaft 28, 5 R. P. S. or 300 R. P. M. for scanning 20 pictures per second. Similarly the product of the number of line-scanning slots 18 times the speed of disc 17 in R. P. S. is equal to the product of the number of lines per picture times the number of pictures per second. For example, the number of line-scanning slots 18 may be 20, and the speed of disc 17, 60 R. P. S. or 3600 R. P. M. for scanning a 60-line picture at 20 pictures per second.

The size of the optical image obtained is equal to the size of the useful field of mirrors 24, and this image size may be apparently enlarged by the interposition of a convex lens between mirrors 24 and the observer, though I prefer to make the assembly of such size as to produce a directly viewed picture of the size desired.

Diffusing or secondary image screen 22 is employed for the purpose, interalia, of securing a wide visual angle of spread of the final optical image, in accordance with the disclosures of the co-pending application of Harold P. Donle, entitled "Television apparatus and method" filed July 11, 1931, and bearing Serial No. 550,117.

Substantially no distortion is evident in the image except that due to the slight non-linear characteristic of concave cylindrical lens 21. The amount of this distortion may be made as small as desired by increasing the focal length of lens 21 and increasing the size of line-scanning disc 17, by increasing the focal length of lens 21 and increasing the distance between disc 17 and screen 22, or by omitting lens 21 and using a sufficiently large disc or other form of line-scanner.

It is desirable that mirrors 24 be narrow in the direction of their motion, so that no overlapping may occur at the upper and lower edges of the image. Narrowing the mirrors 24 may reduce the vertical visual angle but does not affect the horizontal visual angle, so that the resulting visual field is maintained of suitable proportions. By using slightly curved mirrors the vertical visual angle may be increased.

Slots 18 in line-scanning disc 17 may be made narrow for high-detail scanning, as disclosed by Harold P. Donle in co-pending application No. 433,670, filed March 6, 1930.

Motor 20 may be of a variable speed or universal type, and may be supplemented by a small synchronizer on the same shaft 19, the latter being controlled by the received picture signal according to methods familiar in the television art. The construction of all moving parts should preferably be of sufficiently small inertia to allow synchronous operation with small power.

The brilliance of the image is, caeteris paribus, determined by the completeness of focusing by lenses 14 and 15, by the width of slots 18, and by the transmission efficiency of screen 22.

Framing of the received picture during operation may be accomplished by various well known methods. Field framing may be accomplished by the use of a clutch inserted in shaft 33, or by momentarily disconnecting the power supply from motor 20 until the image is in proper visual frame. Line framing may be accomplished by slightly rotating the field of synchronous motor 20 or by slightly shifting the phase of its alternating current supply as by a variable resistance or reactance in series with one or more of the motor supply leads.

Another construction utilizing my invention may be derived from the first, already described, by the substitution of a mirror drum in place of the slotted disc, together with incidental changes in the optical system and in the drive system for shaft 28.

Referring to Fig. 6, at 53 is shown a drum, carrying a plurality of plane mirrors 52 fixed upon its cylindrical surface, and mounted on shaft 61 of motor 54.

The axes of mirrors 52 are parallel to the axis of drum 53, and said mirrors may be separate glass mirrors, or may be of some metal such as silver, chromium, or Monel metal plated or mechanically fastened on milled surfaces of drum 53 and suitably polished.

Lens 21, stop 23, and screen 22 may be the same as in the first form described, as also may be all the subsequent parts in the path of light to the observer. The shaft 28 of the field scanning mechanism may be driven from motor 54 through sprocket 55, chain 56, sprocket 57, shaft 58 supported in bearing 62, and bevel gears 59 and 60, or by other suitable drive systems.

Spherical convex lenses 65 and 66 are interposed between light source 11 and mirror drum 53, and serve to project light beam 63—64 from source 11 onto screen 22 through cylindrical concave lens 21. Lenses 65 and 66 may, if so desired, be replaced by a suitable single lens. Stop 67 may be provided with a small rectangular or other suitably shaped aperture whose edges are beveled to obtain a sharply defined light ray, and serves to limit ray 63 before reflection from mirror 52, but may be omitted if source 11 provides an adequately defined beam of light.

The operation of my invention with line scanning drum 53 as in Fig. 6 is in many particulars similar to that with line scanning disc 17 as in Fig. 1. The illustrative example of a number of scanning elements and speed heretofore given for disc 17 may be applied likewise to drum 53.

Many other variations and combinations of my invention are possible without departing from the spirit thereof as defined in the appended claims.

For example, by replacing light source 11 by a photo electric device and providing lenses, where shown, of commensurate quality, the apparatus disclosed herein may be adapted for scanning a real subject at the television transmitter.

Some of the lenses shown are not essential to the operation of this invention, merely serving to increase the optical efficiency thereof.

Likewise the stops or delimiting apertures may be omitted or modified within my broad invention.

Methods of securing the scanning in one dimension by means other than the slitted disc, or mirror drum, can be employed.

The line scanning mechanism and light source may be tilted relative to the stop 45 and in a plane perpendicular to the field of view, to provide a more nearly straight path of light from light source 11 to mirrors 24.

Mechanical means for moving the mirrors about their individual axes, other than the cam means shown, will be apparent to one skilled in the mechanical art.

Instead of reflection by means of individually moved flat or slightly curved mirrors, I may use refraction by individually moved refractive elements such as prisms and the like, to secure the scanning, in the second dimension, of the optical image. Similarly, tilting or effectively non-planar mirrors or refractors may be used for both field-scanning and line-scanning in the same instrument. The invention is to be understood as limited only by the scope of the appended claims, to wit.

I claim:

1. In a television receiver, a rotating drum, a series of mirrors pivotally carried by said drum, and means for tilting the mirrors on the drum about axes substantially parallel to the axis of the drum as they rotate with the drum across the scanning field.

2. In a television receiver, a traveling carrier, a series of mirrors supported by and traveling with the carrier, and means for tilting the mirrors with respect to the carrier about axes substantially parallel to the axis of the carrier while they are crossing the scanning field.

3. In a television scanning apparatus, a plurality of optical reflective elements each provided with a rocker arm and so pivotally mounted that the axes of said pivots constitute elements of a cylinder, and an adjustable cam adapted to operate on said rocker arms, causing rays from an external luminous line incident to said reflective elements in all positions thereof to be reflected and converged to another external line whose position is variable according to the contour of said adjustable cam.

4. A direct viewing television scanner comprising means for scanning a field in one direction and mirror means for scanning said field in the other direction, said mirror means including a plurality of mirrors each rotatably mounted on its individual axis, and a rotatably mounted drum carrying said mirrors with their individual axes eccentric to the drum axis, means for rotating said drum about its axis and means for rotating said mirrors about their individual axes while in the field of view, so that each mirror changes its effective angle of reflection with respect to its radius of mounting as it passes across the field of view.

5. A television scanner including means for scanning in one direction and mirror means for scanning in the other direction, said mirror means including a plurality of mirrors mounted on individual axes and a rotatable drum carrying the individual mirror axes mounted thereupon and eccentric to the axis of said drum, means for rotating the drum and means for simultaneously rotating the mirrors about their individual axes while in the scanning field, so as to allow direct viewing therein of a field, one of whose dimensions is substantially equal to the distance between the respective mirrors upon said drum.

6. A direct viewing television scanner including means for scanning in one dimension so as to produce an optical image which can be directly viewed in that dimension, and optical reflecting means for scanning in the other dimension so as to produce an optical image which can be directly viewed in the other dimension, said last mentioned scanning means including a carrier drum, means for rotating said drum and mounted on said drum so as to rotate bodily therewith, a plurality of reflecting surfaces, the greater dimension of each being substantially parallel to the axis of said drum at all instants during the rotation thereof, and whose effective angle of reflection relative to a stationary plane including the axis of said drum remains substantially constant throughout the portion of rotation of said drum when said reflecting surfaces are active in scanning.

7. In a television scanner, means for scanning an optical image in one dimension only, comprising means for moving a reflecting surface about an axis so that its effective surface in one dimension is always parallel to said axis and comprising means for altering its effective angle of reflection in the other dimension so that said angle remains substantially constant, when in the field of view, relative to a stationary plane including said axis, so as to secure direct viewing of said image in one dimension.

8. Television scanning apparatus for scanning in one direction including a mirror, means for moving said mirror about an axis so as to describe the curved surface of a cylinder, and means for altering the effective angle of reflection of said mirror by tilting the mirror with respect to a radius of the cylinder while in the field of view, while maintaining its length substantially parallel to the axis of rotation, whereby said mirror may produce a directly viewable image larger than the size of said mirror.

JOHN V. L. HOGAN.